US012731905B2

(12) United States Patent
Nishizawa

(10) Patent No.: US 12,731,905 B2
(45) Date of Patent: Sep. 8, 2026

(54) COMMUNICATION APPARATUS AND COMMUNICATION SYSTEM

(71) Applicant: CANON KABUSHIKI KAISHA, Tokyo (JP)

(72) Inventor: Takaya Nishizawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 44 days.

(21) Appl. No.: 18/775,800

(22) Filed: Jul. 17, 2024

(65) Prior Publication Data

US 2025/0030169 A1 Jan. 23, 2025

(30) Foreign Application Priority Data

Jul. 20, 2023 (JP) ................................ 2023-118276

(51) Int. Cl.

*H01Q 13/08* (2006.01)
*H01P 3/00* (2006.01)
*H01P 3/08* (2006.01)
*H04L 25/02* (2006.01)

(52) U.S. Cl.

CPC ........... *H01Q 13/085* (2013.01); *H01P 3/003* (2013.01); *H01P 3/081* (2013.01); *H01P 3/085* (2013.01); *H04L 25/0272* (2013.01)

(58) Field of Classification Search

CPC .......... H01P 3/085; H01P 3/081; H01P 3/003; H04L 25/0272; H01Q 13/085
USPC ......... 333/202–204, 208, 236–238, 245–246
See application file for complete search history.

(56) References Cited

U.S. PATENT DOCUMENTS 6,677,831 B1 * 1/2004 Cheng .................... H05K 1/025 333/236
2020/0127703 A1 * 4/2020 Yukimasa ................ H04B 5/22

FOREIGN PATENT DOCUMENTS

WO 2015094802 A1 6/2015

* cited by examiner

*Primary Examiner* — Rakesh B Patel
(74) *Attorney, Agent, or Firm* — Canon U.S.A., Inc. IP Division

(57) ABSTRACT

A communication apparatus includes a transmission line configured to communicate with a communication electrode of a communication partner apparatus through electromagnetic field coupling, a transmitter connected with a first end of the transmission line, and a terminator connected with a second end of the transmission line, wherein the transmission line includes a first transmission line portion having a first characteristic impedance, a second transmission line portion disposed between the first transmission line portion and the transmitter and/or between the first transmission line portion and the terminator, and configured to provide a second characteristic impedance different from the first characteristic impedance, and a third transmission line portion disposed between the first and the second transmission line portions, and configured to provide a third characteristic impedance between the first and the second characteristic impedances, in a predetermined direction for a transition from the first to the second transmission line portion.

9 Claims, 7 Drawing Sheets

COMMUNICATION APPARATUS AND COMMUNICATION SYSTEM

BACKGROUND

Field

The present disclosure relates to a communication apparatus and a communication system.

Description of the Related Art

A communication system is known to perform large-capacity data transmission within or between proximal apparatuses by applying a wireless communication technique based on the electromagnetic field coupling. For example, in production systems and robotic apparatuses, wireless communication between a mechanical moving unit and a fixing unit is used for abrasion reduction and free rotation of cables.

WO 2015/094802A1 discusses a technique for performing wireless communication between a differential transmission line and a near-field probe on a reception apparatus. The transmission line is provided with a signal source (transmitter) for outputting a data signal and a terminator, and the reception apparatus moves relative to the differential transmission line while maintaining a constant distance therefrom. The differential transmission line discussed in WO 2015/094802A1 is designed to provide impedance matching with the signal source, and the terminator is also terminated with a matched impedance. This configuration indicates that a wide-bandwidth response is possible.

SUMMARY

According to some embodiments, a communication apparatus includes a transmission line configured to communicate with a communication electrode of a communication partner apparatus through electromagnetic field coupling, a transmitter connected with a first end of the transmission line, and a terminator connected with a second end different from the first end of the transmission line, wherein the transmission line includes a first transmission line portion having a first characteristic impedance, a second transmission line portion disposed between the first transmission line portion and the transmitter and/or between the first transmission line portion and the terminator, and configured to provide a second characteristic impedance different from the first characteristic impedance, and a third transmission line portion disposed between the first and the second transmission line portions, and configured to provide a third characteristic impedance between the first and the second characteristic impedances, in a predetermined direction for a transition from the first to the second transmission line portion.

Further features of the present disclosure will become apparent from the following description of exemplary embodiments with reference to the attached drawings.

BRIEF DESCRIPTION OF THE DRAWINGS

FIG. 1 illustrates a first example of an overall configuration of a wireless communication system according to a first exemplary embodiment of the present disclosure.

FIGS. 2A and 2B each illustrate a second example of an overall configuration of the wireless communication system according to the first exemplary embodiment of the present disclosure.

DESCRIPTION OF THE EMBODIMENTS

Figure 3:
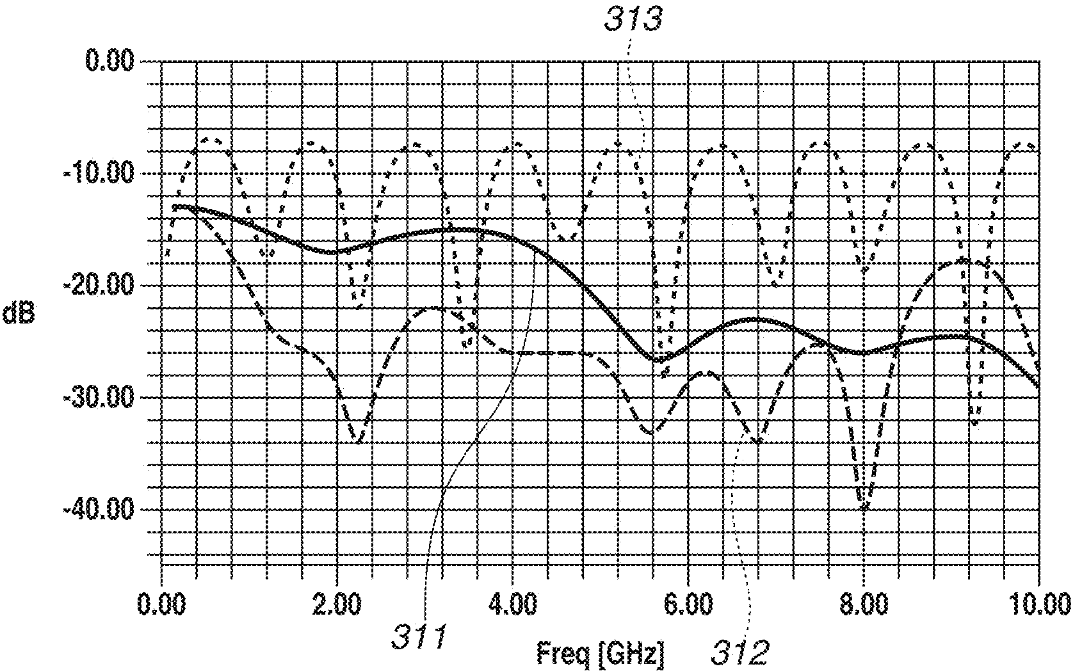
FIG. 3 illustrates an effect of characteristic impedance conversion by a quarter wavelength transformer with reference to reflection characteristics.

Various exemplary embodiments, features, and aspects of the present disclosure will be described below with reference to the accompanying drawings.

A first exemplary embodiment of the present disclosure will be described below.

Figure 1:
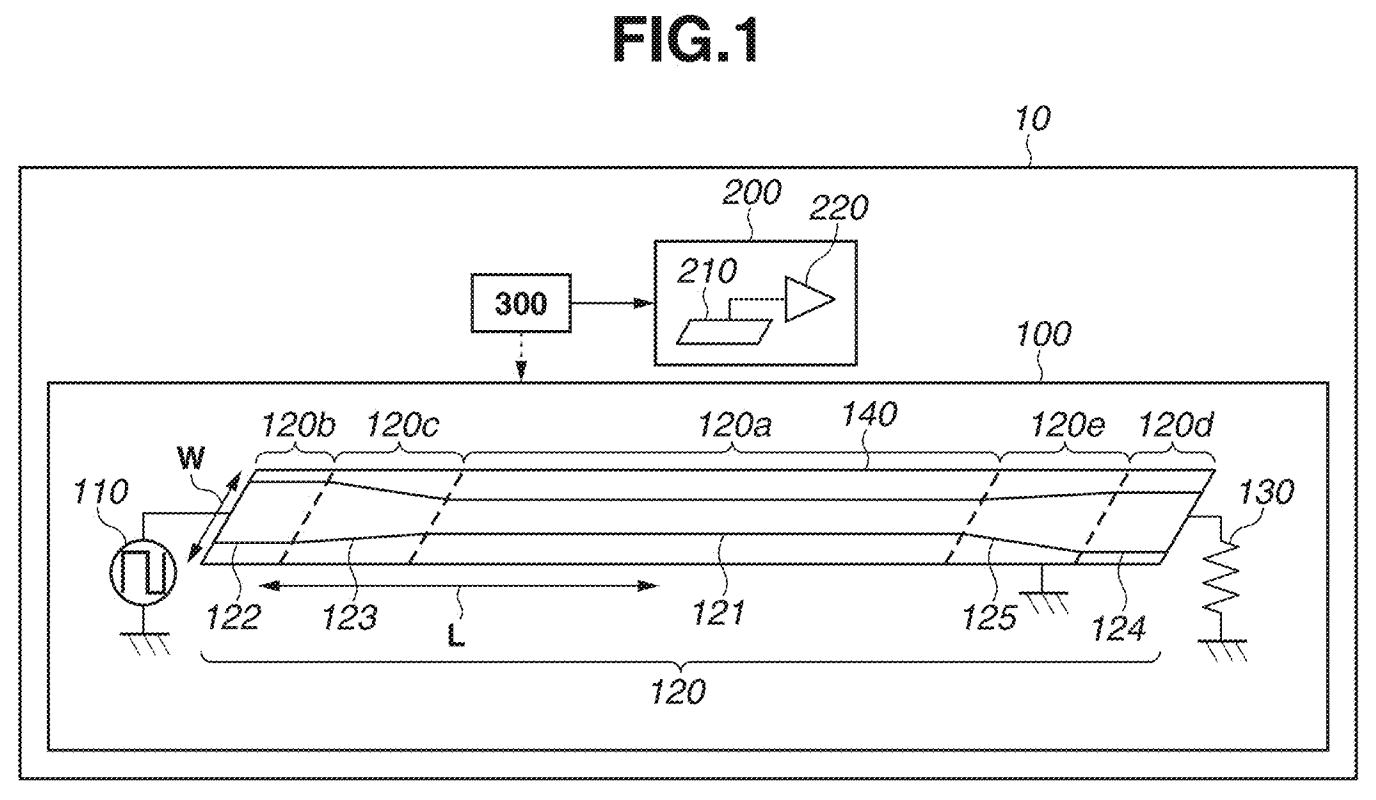

FIG. 1 illustrates a first example of an overall configuration of a wireless communication system 10 according to the first exemplary embodiment of the present disclosure. As illustrated in FIG. 1, the wireless communication system 10 includes a transmission apparatus 100, a reception apparatus 200, and a movement control apparatus 300.

The transmission apparatus 100 is a communication apparatus for wirelessly communicating with the reception apparatus 200 as a communication partner apparatus through the electromagnetic field coupling. As illustrated in FIG. 1, the transmission apparatus 100 includes an input signal source 110, a transmission line 120, a terminator 130, and a reference potential surface 140. The reception apparatus 200 as a communication partner apparatus includes a reception electrode 210 as a communication electrode for wirelessly communicating with the transmission apparatus 100, and a reception circuit 220 for processing a signal detected by the reception electrode 210, to generate an output signal. The movement control apparatus 300 relatively moves the transmission apparatus 100 and the reception apparatus 200 in the longitudinal direction L (predetermined direction) of the transmission line 120. According to the present exemplary embodiment, the movement control apparatus 300 is configured to move the reception apparatus 200 in the longitudinal direction L of the transmission line 120, as illustrated by the solid lines in FIG. 1. According to the present disclosure, the configuration of the movement control apparatus 300 is not limited to the configuration of moving the reception apparatus 200 in the longitudinal direction L of the transmission line 120. However, examples of the configurations of the apparatus 300 include the configuration of moving the transmission apparatus 100 in the longitudinal direction L of the transmission line 120, as illustrated by the dotted line in FIG. 1.

An internal configuration of the transmission apparatus 100 will be described below.

The input signal source 110 is a transmitter electrically connected with a first end of the transmission line 120. The transmission line 120 is used to communicate with the reception electrode 210 of the reception apparatus 200 through the electromagnetic field coupling. The terminator 130 is electrically connected with a second end different from the first end (the side connected with the input signal source 110) of the transmission line 120. The reference potential surface 140 is a ground plane for providing the reference potential of the transmission line 120.

The transmission line 120 of the transmission apparatus 100 will be described in detail below.

The transmission line 120 includes a region 120*a* where the line width in the width direction W is variable, a region 120*b* where the line width in the width direction W is determined by the input signal source 110, and a region 120*c* disposed between the regions 120*a* and 120*b*, where the line width in the width direction W gradually changes. According to the present exemplary embodiment, the portion of the transmission line 120 corresponding to the region 120*a* is a transmission line portion 121, the portion of the transmission line 120 corresponding to the region 120*b* is a transmission line portion 122, and the portion of the transmission line 120 corresponding to the region 120*c* is a transmission line portion 123. The transmission line 120 also includes a region 120*d* where the line width in the width direction W is determined by the terminator 130, and a region 120*e* disposed between the regions 120*a* and 120*d*, where the line width in the width direction W gradually changes. According to the present exemplary embodiment, the portion of the transmission line 120 corresponding to the region 120*d* is a transmission line portion 124, and the portion of the transmission line 120 corresponding to the region 120*e* is a transmission line portion 125.

The transmission line portion 121 is a first transmission line portion having a first characteristic impedance. The transmission line portion 122 disposed between the transmission line portion 121 and the input signal source 110 as a transmitter has a characteristic impedance different from the first characteristic impedance.

The transmission line portion 124 disposed between the transmission line portion 121 and the terminator 130 has a characteristic impedance different from the first characteristic impedance. According to the present disclosure, at least either one of the transmission line portions 122 and 124 is referred to as a second transmission line portion, and the second transmission line portion has a second characteristic impedance. The transmission line portion 123 disposed between the transmission line portions 121 and 122 has a structure in which the line width in the width direction W gradually changes in the longitudinal direction L (predetermined direction) for the transition from the transmission line portion 121 to the transmission line portion 122. The transmission line portion 125 disposed between the transmission line portions 121 and 124 has a structure in which the line width in the width direction W gradually changes in the longitudinal direction L (predetermined direction) for the transition from the transmission line portion 121 to the transmission line portion 124. The structures of the transmission line portions 123 and 125 in which the line width gradually changes include a taper structure (structure to obliquely change) and a structure to change stepwise. According to the present exemplary embodiment, the transmission line portions 123 and 125 is a third transmission line portion having a third characteristic impedance between the first and the second characteristic impedances. More specifically, the third characteristic impedance is larger than the above-described second characteristic impedance and smaller than the above-described first characteristic impedance. Each of the transmission line portions 123 and 125 is equivalent to a characteristic impedance conversion line portion where the line width changes by the line width in the width direction W in the transmission line portions at both ends.

The transmission line portion 121 has a first line width in the width direction W. The transmission line portions 122 and 124 have a second line width larger than the first line width of the transmission line portion 121 in the width direction W. The transmission line portion 123 has a line width between the first line width of the transmission line portion 121 and the second line width of the transmission line portion 122 in the width direction W. The transmission line portion 125 has a line width between the first line width of the transmission line portion 121 and the second line width of the transmission line portion 124 in the width direction W. The line widths of the transmission line portions 123 and 125 gradually change in the longitudinal direction L (predetermined direction) of the transmission line 120. The line width of the transmission line portion 122 provides the same characteristic impedance as that of the input signal source 110. The line width of the transmission line portion 124 provides the same characteristic impedance as that of the terminator 130.

The length of the transmission line portions 123 and 125 in the longitudinal direction L is determined by the data transmission rate.

In the wireless communication system 10 according to the present exemplary embodiment, the transmission line 120 and the reception electrode 210 wirelessly communicate with each other through the electromagnetic field coupling. The reception apparatus 200 relatively moves along the transmission line 120 while maintaining a constant distance on the transmission line 120. This movement is implemented by a movement control apparatus 300 such as a motor. The line width of the reception electrode 210 is determined to enable the transmission line 120 to communicate with the transmission line 120, and is not limited to any particular width.

Figures 2A, 2B:
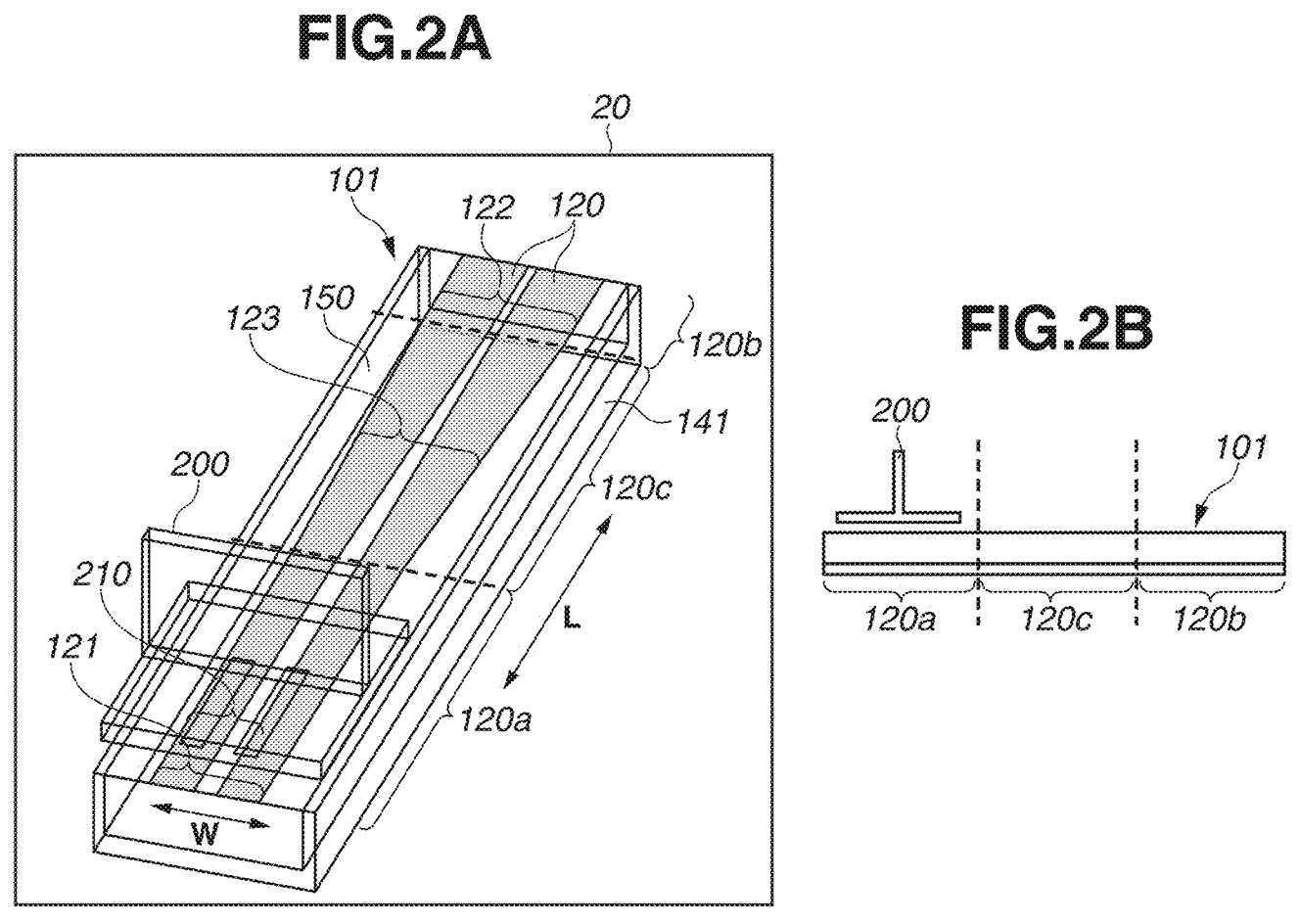

FIG. 2A illustrates a second example of an overall configuration of a wireless communication system 20 according to the first exemplary embodiment of the present disclosure. Referring to FIG. 2A, functional configurations similar to those in FIG. 1 are assigned the same reference numerals, and detailed descriptions thereof will be omitted.

In the wireless communication system 20 illustrated in FIG. 2A, the transmission line 120 of the wireless communication system 10 illustrated in FIG. 1 is implemented by a differential transmission line, and some regions of the transmission apparatus 100 illustrated in FIG. 1 are used as a transmission apparatus 101. More specifically, the transmission apparatus 101 illustrated in FIG. 2A includes the region 120*a* as a portion of the transmission line portion 121, the region 120*b* as a portion of the transmission line portion 122, and the region 120*c* as a portion of the transmission line portion 123 in the transmission line 120. In other words, the transmission apparatus 101 is equivalent to a region near the transmission line 120 connected with the input signal source 110 illustrated in FIG. 1. The transmission apparatus 101 includes a conductor 141 for providing a reference potential including the reference potential surface 140 illustrated in FIG. 1, and a substrate 150. The space between the conductor 141 and the substrate 150 is air. The substrate 150 includes the transmission line (differential transmission line) 120. Referring to the example illustrated in FIG. 2A, the transmission line portion 121 positioned in the region 120*a* where the line width in the width direction W is variable has a characteristic impedance of 160 ohms (Ω). The transmission line portion 122 positioned in the region 120*b* where the line width in the width direction W is determined by the input signal source 110 has a characteristic impedance of 100Ω.

The operating principle of a quarter wavelength transformer is used for the transmission line portion 123 (which may include the transmission line portion 125 in FIG. 1) equivalent to the characteristic impedance conversion line portion according to the present exemplary embodiment. The transmission line portion 123 of the wireless communication system 20 illustrated in FIG. 2A is a characteristic impedance conversion line portion having a tapered quarter wavelength transformer. The quarter wavelength transformer refers to a transmission line having a length of the quarter wavelength of the carrier frequency, connected to convert the characteristic impedance. This transformer is used when a transmission line having a different characteristic impedance is connected.

According to the present exemplary embodiment, the transmission line 120 has, for example, a line width larger than the width of the reception electrode 210 as the communication electrode of the reception apparatus 200 in the width direction W, as illustrated in FIG. 2A. Using such a configuration enables maintaining a constant electromagnetic field coupling or higher at any position above the transmission line 120, thus maintaining a constant signal intensity. Referring to the example illustrated in FIG. 2A, since a differential transmission line is used as the transmission line 120, the reception electrode 210 is disposed to face the differential transmission line.

FIG. 2B illustrates the wireless communication system 20 illustrated in FIG. 2A viewed from the lateral side. Referring to FIG. 2B, the region 120*a* includes the transmission line portion 121 having a differential impedance of 160Ω, the region 120*c* includes the transmission line portion 123 equivalent to the characteristic impedance conversion line portion, and the region 120*b* includes the transmission line portion 122 having a differential impedance of 100Ω.

FIG. 3 illustrates an effect of the characteristic impedance conversion by the quarter wavelength transformer, with reference to the reflection characteristics.

Reflection characteristics 313 refer to the reflection characteristics of the transmission line when a signal is directly supplied to the transmission line having a differential impedance of 160Ω, with a differential impedance of 100Ω without using the quarter wavelength transformer.

In this case, because of the input impedance mismatching with the transmission line, reflection occurs and signal transmission is disabled. For example, if the carrier frequency is 5 gigahertz (GHz) and a dielectric constant is close to 1, a characteristic impedance conversion line portion with a 15 millimeters (mm) length is used.

Reflection characteristics 311 refer to the reflection characteristics of the transmission line when a signal is supplied to the transmission line portion 122 with a differential impedance of 100Ω in the wireless communication system 20 in FIG. 2A. In this case, the transmission line portion 123 equivalent to the characteristic impedance conversion line portion has a length of 15 mm in the longitudinal direction L. When characteristic impedance conversion is performed by using a quarter wavelength transformer, reflection is restrained only in the 5 GHz bandwidth or higher, and the characteristic impedance is converted. In a known method, to widen the conversion bandwidth of the quarter wavelength transformer, quarter wavelength transformers are connected in cascade to reduce impedance variations in each stage. For example, in the wireless communication system 20 in FIG. 2A, if the transmission line portion 123 has a length of 60 mm corresponding to four stages of the quarter wavelength transformer with respect to the 5 GHz carrier frequency, reflection characteristics 312 result. More specifically, the reflection characteristics 312 decrease in the 1 GHz to 8 GHz bandwidths and the characteristic impedance is converted.

Referring to FIG. 3, if a signal is input to the transmission line with the input impedance mismatched, reflection occurs. However, the quarter wavelength transformer converts the characteristic impedance to restrict reflection, and the conversion bandwidth changes according to the length of the transformer. The present disclosure determines the length of the transmission line portion 123 in the longitudinal direction L equivalent to the characteristic impedance conversion line portion with reference to the lowest value of the signal frequency to be transmitted. For example, in communication with a data rate of 10 gigabits per second (Gbps), the lowest frequency 500 megahertz (MHz) in the low bandwidth needs to be transmitted through coding. Accordingly, the transmission line portion 123 equivalent to the characteristic impedance conversion line portion has a length of 150 mm which is a quarter wavelength of 500 MHz.

According to the present disclosure, preferably, the transmission line portion 123 (including the transmission line portion 125 in FIG. 1) equivalent to the characteristic impedance conversion line portion (third transmission line portion) is longer in the longitudinal direction L than the length corresponding to a quarter wavelength of the carrier frequency of the data signal to be transmitted. According to the present disclosure, preferably, the transmission line portion 123 (including the transmission line portion 125 in FIG. 1) equivalent to the characteristic impedance conversion line portion is longer in the longitudinal direction L than the length corresponding to a quarter wavelength of the lowest frequency in the transmission bandwidth of the data signal to be transmitted.

Figure 4A:
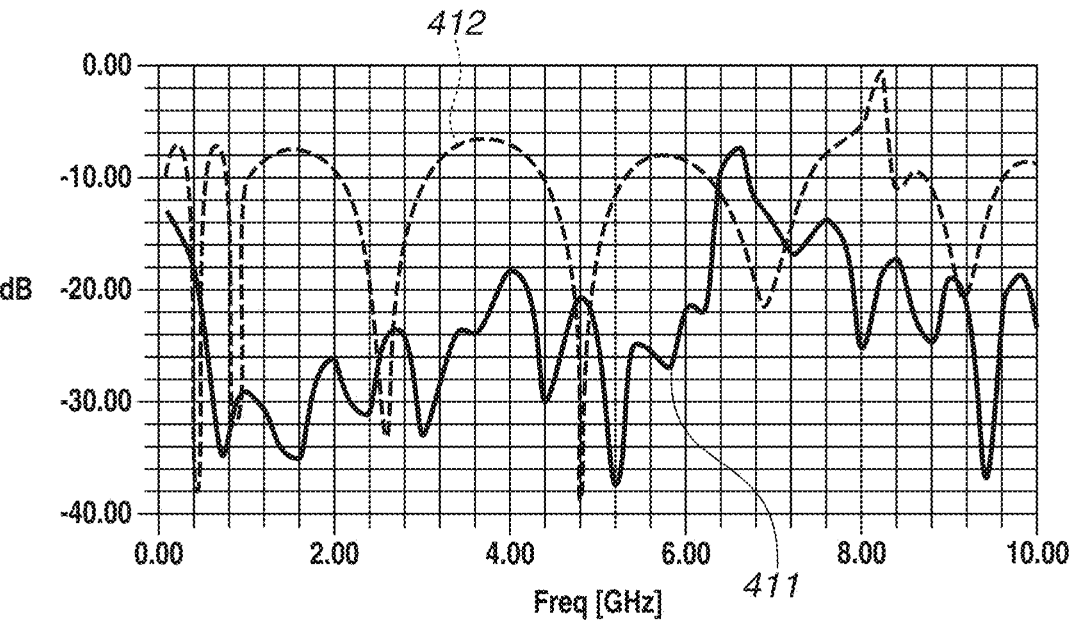
FIG. 4A illustrates reflection characteristic variations according to the presence or absence of a characteristic impedance conversion line portion.
Figure 4B:
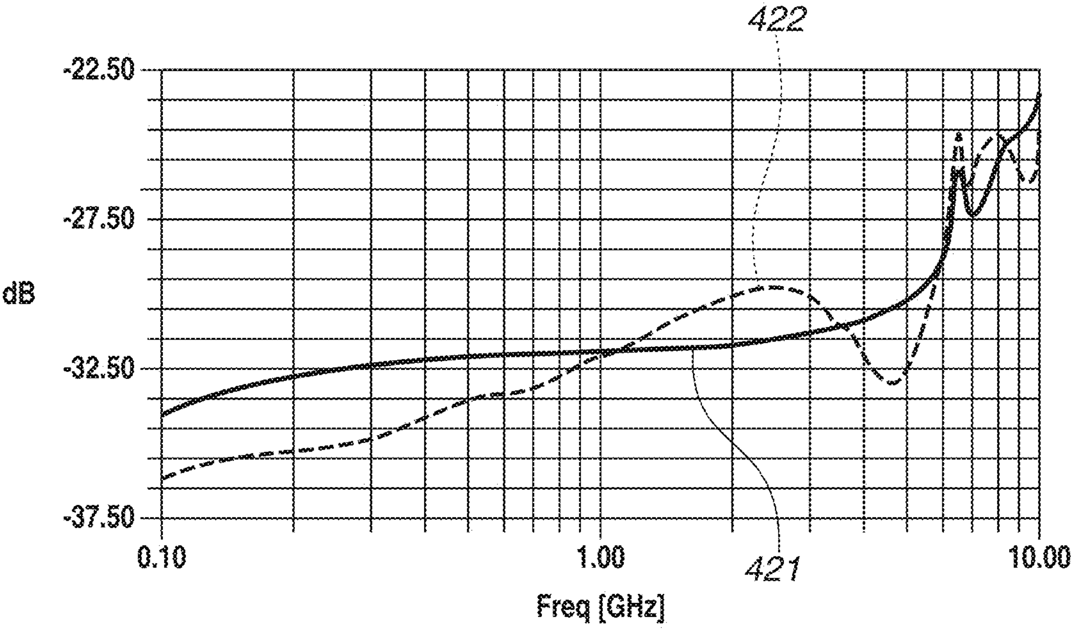
FIG. 4B illustrates transmission characteristic variations on a reception electrode according to the presence or absence of the characteristic impedance conversion line portion.

FIG. 4A illustrates reflection characteristic variations according to the presence or absence of the characteristic impedance conversion line portion, and FIG. 4B illustrates transmission characteristic variations for the reception electrode 210 according to the presence or absence of the characteristic impedance conversion line portion. FIG. 4A illustrates reflection characteristic variations according to the presence or absence of the characteristic impedance conversion line portion. FIG. 4B illustrates transmission characteristic variations for the reception electrode 210 according to the presence or absence of the characteristic impedance conversion line portion.

Reflection characteristics 411 in FIG. 4A indicate the reflection characteristics when the wireless communication system 20 according to the present exemplary embodiment illustrated in FIG. 2A is applied. The reflection characteristics 411 in FIG. 4A refer to the reflection characteristics when a signal is supplied to the transmission line portion 122 with a differential impedance of 100Ω. In this case, the transmission line portion 123 equivalent to the characteristic impedance conversion line portion has a length of 150 mm in the longitudinal direction L. The reflection characteristics 412 in FIG. 4A indicate the reflection characteristics when a signal is directly supplied to a transmission line having a characteristic impedance of 160Ω with a differential impedance of 100Ω without using the above-described characteristic impedance conversion line portion. FIG. 4A illustrates that using the characteristic impedance conversion line portion to be applied to the present exemplary embodiment enables restricting reflection in the 500 MHz bandwidth or higher, and the characteristic impedance conversion is possible. Referring to FIG. 4A, the reflection characteristics suddenly increase at around 6 GHz because of the influence of the resonance between the reception electrode 210 and the transmission line 120. The resonance can be removed by reducing the length of the reception electrode 210.

Transfer characteristics 421 in FIG. 4B illustrate the transfer characteristics when the wireless communication system 20 according to the present exemplary embodiment illustrated in FIG. 2A is applied. More specifically, the transfer characteristics 421 in FIG. 4B refer to the transfer characteristics when a signal is supplied to the transmission line portion 122 with a differential impedance of 100Ω. In this case, the transmission line portion 123 equivalent to the characteristic impedance conversion line portion has a length of 150 mm in the longitudinal direction L. Transfer characteristics 422 in FIG. 4B indicate the transfer characteristics when a signal is supplied to a transmission line having a differential impedance of 160Ω with a differential impedance of 100Ω without using the above-described characteristic impedance conversion line portion. If the characteristic impedance conversion line portion to be applied to the present exemplary embodiment is not used, the transmission characteristics decrease as the frequency decreases from 2 GHz, as indicated by the transfer characteristics 422 in FIG. 4B. In contrast, if the characteristic impedance conversion line portion to be applied to the present exemplary embodiment is used, the transfer characteristics can be maintained between 200 MHz and 5 GHz, as indicated by the transfer characteristics 421 in FIG. 4B. Referring to FIG. 4B, the transmission characteristics suddenly increase at 6 GHz or higher because of the influence of the resonance between the reception electrode 210 and the transmission line 120. The resonance can be removed by reducing the length of the reception electrode 210.

Figure 5:
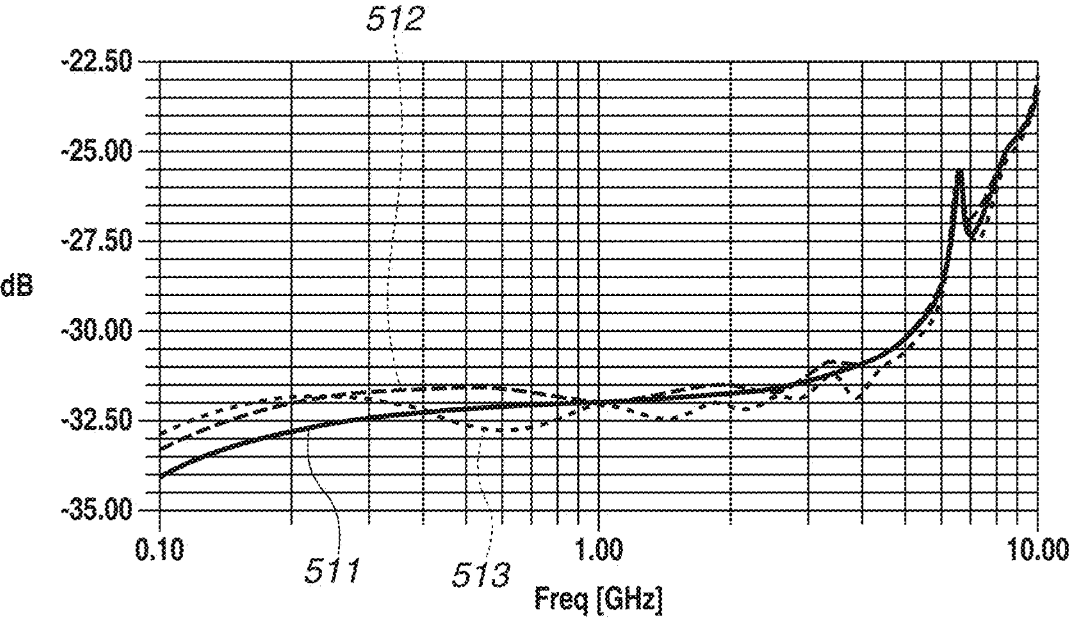
FIG. 5 illustrates an influence of the transfer characteristics for the reception electrode by its position according to the first exemplary embodiment of the present disclosure.

FIG. 5 illustrates an influence of the transfer characteristics for the reception electrode 210 by its position according to the first exemplary embodiment of the present disclosure. Transfer characteristics 511 refer to the transfer characteristics for the reception electrode 210 when the reception electrode 210 is positioned above the transmission line portion 121 in the region 120*a*. Transfer characteristics 512 refer to the transfer characteristics for the reception electrode 210 when the reception electrode 210 is positioned above the transmission line portion 123 in the region 120*c*. Transfer characteristics 513 refers to transfer characteristics for the reception electrode 210 when the reception electrode 210 is positioned above the transmission line portion 122 in the region 120*b*. FIG. 5 illustrates that the transfer characteristics can be maintained between 200 MHz and 5 GHz while the reception electrode 210 is at any position above the transmission line 120. This result demonstrates that the signal intensity can be maintained even when the reception electrode 210 is positioned above the transmission line portion 123 equivalent to the characteristic impedance conversion line portion of the present disclosure.

The above-described result demonstrates that the following effect is provided by using the characteristic impedance conversion line portion of the present disclosure even if the characteristic impedance of the transmission line 120 increases with decreasing line width of the transmission line 120 in the width direction W. More specifically, even in this case, the use of the characteristic impedance conversion line portion of the present disclosure enables supplying a signal without reflection and signal transmission to the reception apparatus 200. Thus, the transmission line 120 can be arranged on a multi-lane basis, enabling large-capacity communication.

The present exemplary embodiment has been described above centering on impedance conversion when the characteristic impedance of the transmission line 120 increases with decreasing line width of the transmission line 120. However, the present disclosure is not limited to the example. The present disclosure is also applicable to impedance conversion, like the present exemplary embodiment, when the characteristic impedance of the transmission line 120 decreases with increasing line width of the transmission line 120. This enables increasing the electromagnetic field coupling between the reception apparatus 200 and the transmission apparatus 100 (or the transmission apparatus 101), making it hard to be affected by external noise and the position change of the reception apparatus 200.

Referring to the above-described example illustrated in FIG. 1, the transmission line portion 123 is provided on the side of the input signal source 110 (transmitter) and the transmission line portion 125 is provided on the side of the terminator 130, as the characteristic impedance conversion line portions of the present exemplary embodiment. The present disclosure is not limited to this form but is also applicable to the form of providing either one of the transmission line portions 123 and 125 as the characteristic impedance conversion line portion. Although the example illustrated in FIG. 2A is based on the form of applying a differential transmission line as the transmission line 120, the present disclosure is not limited to the differential transmission line.

The characteristic impedance and the differential impedance according to the present exemplary embodiment of the present disclosure permits an error of around 5%. For example, according to the present exemplary embodiment, at least either one of the input signal source 110 (transmitter) and the terminator 130 has a differential impedance of 100Ω. However, the differential impedance may be within a range of 100Ω±5Ω if an error of around 5% is permitted as described above.

Even if the line width of the transmission line 120 used for wireless communication is designed according to the mounting space, the first exemplary embodiment of the present disclosure enables impedance matching between the input signal source 110 (transmitter) and the terminator 130, thus improving the communication quality.

A second exemplary embodiment of the present disclosure will be described below centering on elements different from the above-described first exemplary embodiment. Elements common to the first exemplary embodiment will be omitted.

Conventionally, it has been necessary to divide the transmission line of a power supply unit to supply signals in phase to two differential transmission lines, resulting in a complicated structure. This arises an issue of the increased manufacturing cost. The second exemplary embodiment will be described below centering on the form of supplying signals in phase to two differential transmission lines by using the characteristic impedance conversion line portion as the transmission line 120.

Figure 6:
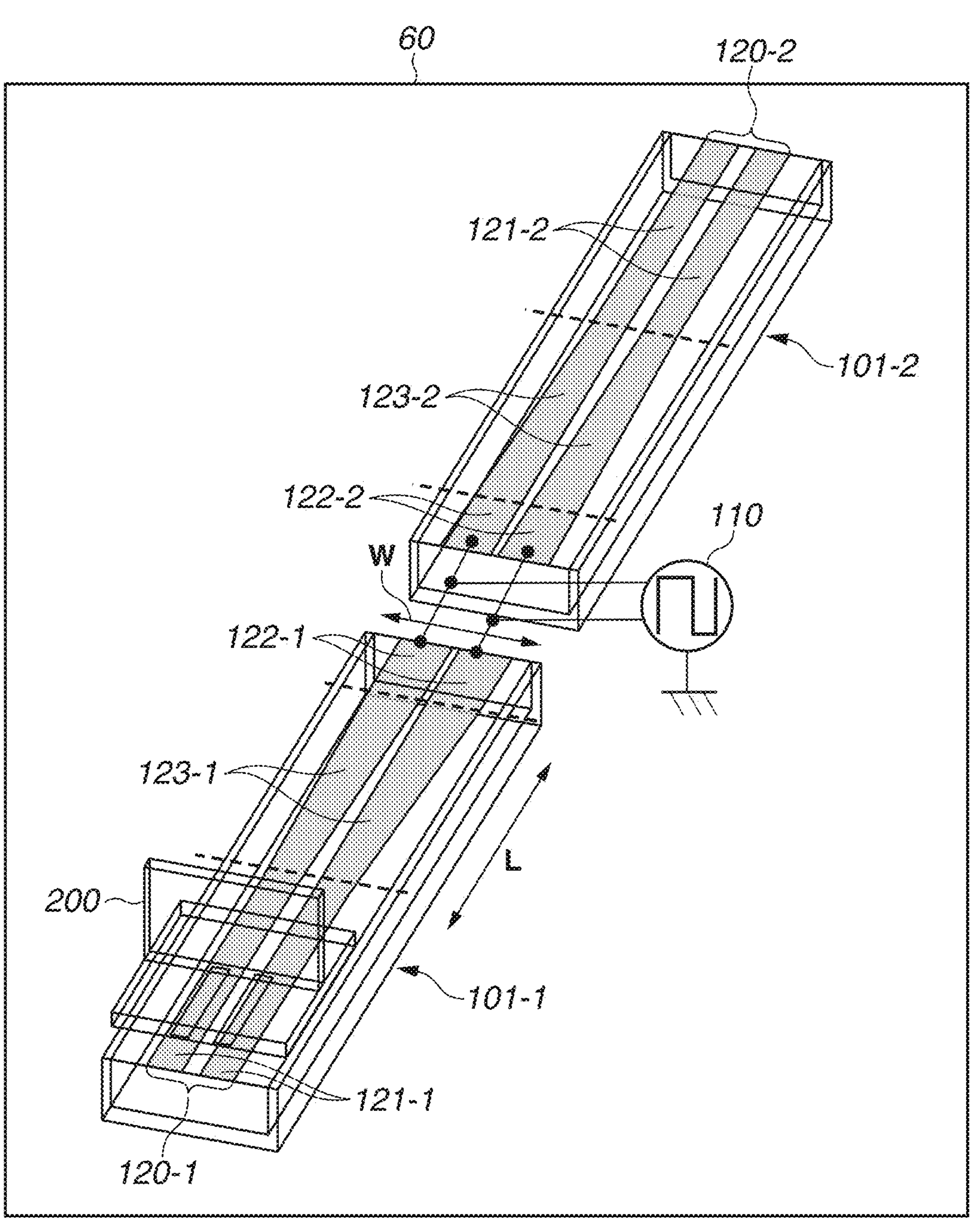
FIG. 6 illustrates an example of an overall configuration of a wireless communication system according to a second exemplary embodiment of the present disclosure.

FIG. 6 illustrates an example of an overall configuration of a wireless communication system 60 according to the second exemplary embodiment of the present disclosure. Referring to FIG. 6, functional configurations similar to those in FIGS. 1 and 2 are assigned the same reference numerals, and detailed descriptions thereof will be omitted.

The wireless communication system 60 illustrated in FIG. 6 includes two different transmission apparatuses 101-1 and 101-2 having the same configuration as that of the transmission apparatus 101 illustrated in FIG. 2A according to the above-described first exemplary embodiment, and the reception apparatus 200 illustrated in FIGS. 1 and 2A according to the above-described first exemplary embodiment. The wireless communication system 60 illustrated in FIG. 6 includes the input signal source 110 illustrated in FIG. 1.

The first exemplary embodiment demonstrates that the use of the characteristic impedance conversion line portion of the present disclosure as the transmission line 120 having a characteristic impedance different from that of the input signal source 110 dissolves characteristic impedance mismatching, thus achieving the improved communication quality. As illustrated in FIG. 6, the second exemplary embodiment uses transmission line portions 123-1 and 123-2 equivalent to the characteristic impedance conversion line portion of the present disclosure for the two transmission lines 120-1 and 120-2, respectively, having characteristic impedances different from that of one input signal source 110.

In the wireless communication system 60 illustrated in FIG. 6, the input impedance of the input signal source 110 is equal to a differential impedance of 50Ω. The transmission apparatus 101-1 has the transmission line 120-1 including transmission line portions 121-1 and 122-1 and the transmission line portion 123-1 equivalent to the characteristic impedance conversion line portion. The transmission apparatus 101-2 has the transmission line 120-2 including transmission line portions 121-2 and 122-2 and the transmission line portion 123-2 equivalent to the characteristic impedance conversion line portion. For example, the transmission line portions 121-1 and 121-2 have a differential impedance of 160Ω, and the transmission line portions 122-1 and 122-2 have a differential impedance of 100Ω.

Figure 7A:
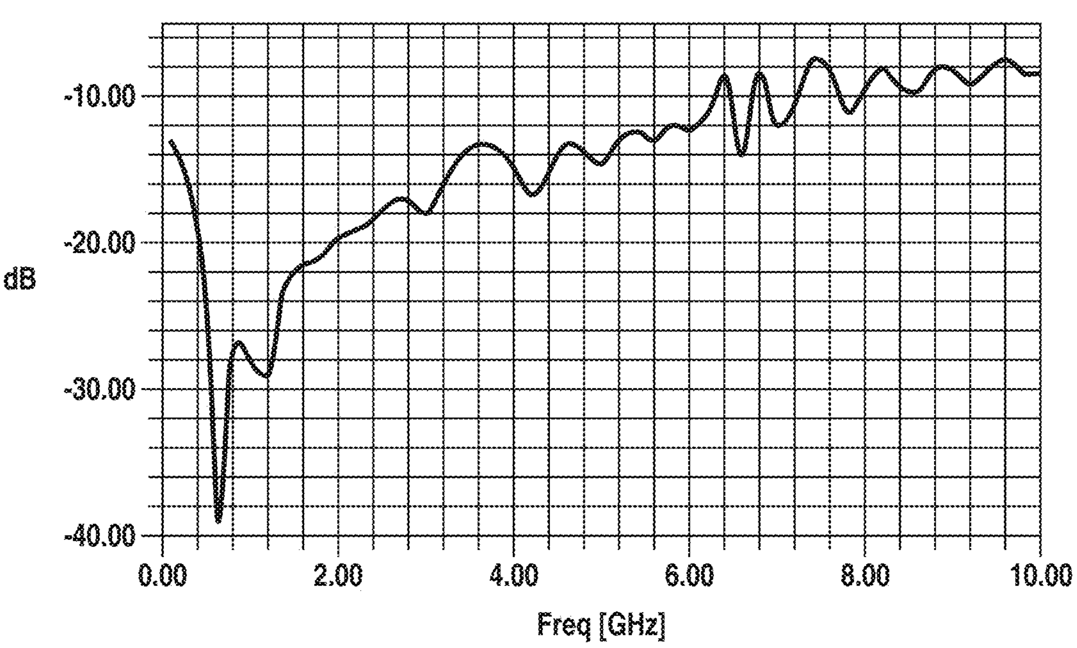
FIGS. 7A and 7B illustrate reflection characteristics and transfer characteristics for the reception electrode, respectively, in the wireless communication system according to the second exemplary embodiment of the present disclosure.
Figure 7B:
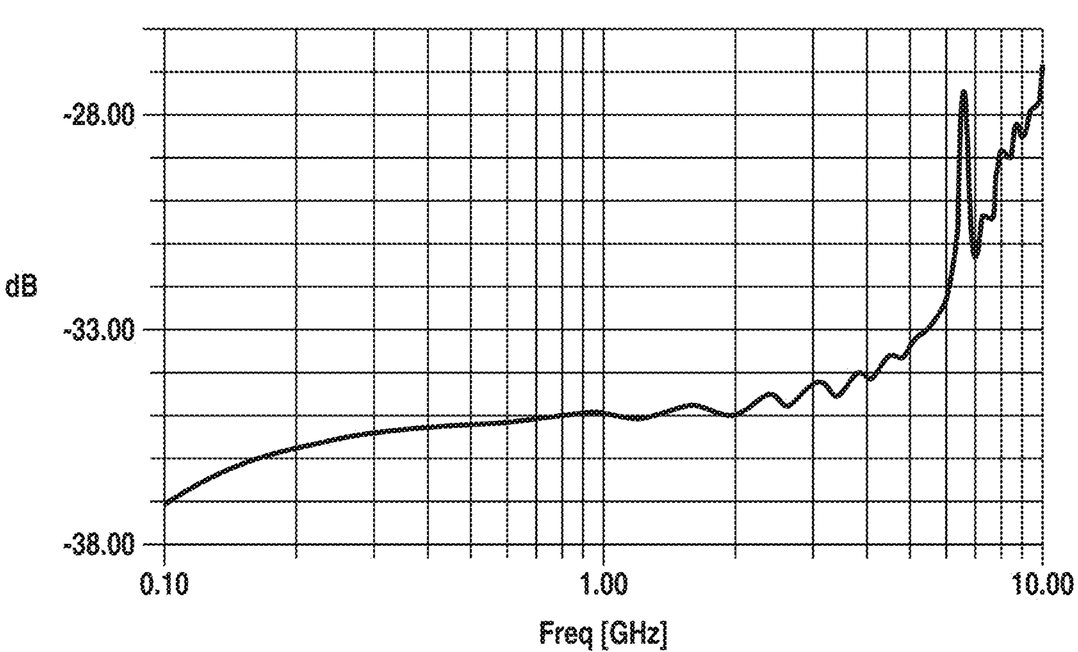

FIGS. 7A and 7B illustrate the reflection characteristics and the transfer characteristics for the reception electrode 210, respectively, in the wireless communication system 60 according to the second exemplary embodiment of the present disclosure. More specifically, FIG. 7A illustrates the reflection characteristics when a signal is supplied from the input signal source 110 having a differential impedance of 50Ω in the wireless communication system 60. In this case, the transmission line portions 123-1 and 123-2 equivalent to the characteristic impedance conversion line portion have a length of 150 mm. FIG. 7A indicates that the reflection characteristics decrease between 500 MHz and 2 GHz and that the characteristic impedance has been converted. FIG. 7B illustrates the transfer characteristics for the reception electrode 210 of the reception apparatus 200 when a signal is supplied to the transmission apparatuses 101-1 and 101-2 including the characteristic impedance conversion line portion with a length of 150 mm from the input signal source 110 having a differential impedance of 50Ω. FIG. 7B indicates that the signal intensity can be maintained between 200 MHz and 4 GHz. Referring to FIG. 7B, the transfer characteristics suddenly increase at 6 GHz or higher because of the influence of the resonance between the reception electrode 210 and the transmission line 120. The resonance can be removed by reducing the length of the reception electrode 210.

This result indicates that one input signal source 110 can be connected with the two transmission lines 120-1 and 120-2 having a characteristic impedance different from that of the input signal source 110.

According to the second exemplary embodiment of the present disclosure, even in the wireless communication system 60 where the two transmission lines 120-1 and 120-2 are connected with one input signal source 110, the transmission line 120 having a line width designed for interference avoidance and communication quality improvement can be used.

The above-described exemplary embodiments of the present disclosure are to be considered as illustrative in embodying the present disclosure, and are not to be interpreted as restrictive on the technical scope of the present disclosure. The present disclosure may be embodied in diverse forms without departing from the technical concepts or essential characteristics thereof.

Various exemplary embodiments, features, and aspects of the present disclosure may include the following configurations:

[Configuration 1]

A communication apparatus including a transmission line configured to communicate with a communication electrode of a communication partner apparatus through the electromagnetic field coupling, a transmitter connected with a first end of the transmission line, and a terminator connected with a second end different from the first end of the transmission line. The transmission line includes a first transmission line portion having a first characteristic impedance, a second transmission line portion disposed between the first transmission line portion and the transmitter and/or between the first transmission line portion and the terminator, and configured to provide a second characteristic impedance different from the first characteristic impedance, and a third transmission line portion disposed between the first and the second transmission line portions, and configured to provide a third characteristic impedance between the first and the second characteristic impedances, in a predetermined direction for a transition from the first to the second transmission line portion.

[Configuration 2]

The communication apparatus according to configuration 1, wherein the third transmission line portion has a structure in which the line width obliquely changes in the predetermined direction.

[Configuration 3]

The communication apparatus according to configuration 1 or 2, wherein the third characteristic impedance is larger than the second characteristic impedance and smaller than the first characteristic impedance.

[Configuration 4]

The communication apparatus according to any one of configurations 1 to 3, wherein the first transmission line portion has a first line width, wherein the second transmission line portion has a second line width larger than the first line width, and wherein the third transmission line portion has a line width that is between the first and the second line widths, and that gradually changes in the predetermined direction.

[Configuration 5]

The communication apparatus according to any one of configurations 1 to 4, wherein the third transmission line portion is longer in the predetermined direction than the length corresponding to a quarter wavelength of a carrier frequency of a data signal to be transmitted.

[Configuration 6]

The communication apparatus according to any one of configurations 1 to 4, wherein the third transmission line portion is longer in the predetermined direction than the length corresponding to a quarter wavelength of a lowest frequency in a transmission bandwidth of a data signal to be transmitted.

[Configuration 7]

The communication apparatus according to any one of configurations 1 to 6, wherein the transmission line has a line width larger than the width of the communication electrode.

[Configuration 8]

The communication apparatus according to any one of configurations 1 to 7, wherein the transmission line is a differential transmission line.

[Configuration 9]

The communication apparatus according to configuration 8, wherein at least either one of the transmitter and the terminator has a differential impedance of 100Ω±5Ω.

[Configuration 10]

A communications system including the communication apparatus according to any one of configurations 1 to 9, the communication partner apparatus, and a movement control apparatus configured to relatively move the communication apparatus according to any one of configurations 1 to 9 and the communication partner apparatus in the predetermined direction.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-118276, filed Jul. 20, 2023, which is hereby incorporated by reference herein in its entirety.

What is claimed is:

1. A communication apparatus comprising:

a transmission line extending in a predetermined direction configured to communicate with a communication electrode of a communication partner apparatus through electromagnetic field coupling;

a transmitter connected with a first end of the transmission line; and a terminator connected with a second end different from the first end of the transmission line, wherein the transmission line comprises:

a first transmission line portion having a first characteristic impedance;

a second transmission line portion disposed between the first transmission line portion and the transmitter and between the first transmission line portion and the terminator, and configured to provide a second characteristic impedance different from the first characteristic impedance; and a third transmission line portion disposed between the first and the second transmission line portions in the predetermined direction, and configured to provide a third characteristic impedance between the first and the second characteristic impedances, wherein the third characteristic impedance is larger than the second characteristic impedance and smaller than the first characteristic impedance.

2. The communication apparatus according to claim 1, wherein the third transmission line portion has a structure in which a line width obliquely changes in the predetermined direction.

3. A communications system comprising:

the communication apparatus according to claim 1;

the communication partner apparatus; and a movement control apparatus configured to relatively move the communication apparatus according to claim 1 and the communication partner apparatus in the predetermined direction.

4. The communication apparatus according to claim 1, wherein the first transmission line portion has a first line width, wherein the second transmission line portion has a second line width larger than the first line width, and wherein the third transmission line portion has a line width that is between the first and the second line widths and that gradually changes in the predetermined direction.

5. The communication apparatus according to claim 1, wherein the third transmission line portion is longer in the predetermined direction than a length corresponding to a quarter wavelength of a carrier frequency of a data signal to be transmitted.

6. The communication apparatus according to claim 1, wherein the third transmission line portion is longer in the predetermined direction than a length corresponding to a quarter wavelength of a lowest frequency in a transmission bandwidth of a data signal to be transmitted.

7. The communication apparatus according to claim 1, wherein the transmission line has a line width larger than a width of the communication electrode.

8. The communication apparatus according to claim 1, wherein the transmission line is a differential transmission line.

9. The communication apparatus according to claim 8, wherein at least either one of the transmitter and the terminator has a differential impedance of 100Ω±5Ω (ohms).

* * * * *